United States Patent [19]

Te Velde

[11] Patent Number: 5,005,951
[45] Date of Patent: Apr. 9, 1991

[54] LIQUID CRYSTAL DISPLAY DEVICE

[75] Inventor: Ties S. Te Velde, Waalre, Netherlands

[73] Assignee: U.S. Philips Corporation, New York, N.Y.

[21] Appl. No.: 204,144

[22] Filed: Jun. 8, 1988

[30] Foreign Application Priority Data

Jun. 10, 1987 [NL] Netherlands .................. 8701347

[51] Int. Cl.$^5$ .................................. G02F 1/133
[52] U.S. Cl. ................................ 350/334; 350/336; 350/339 R; 350/344
[58] Field of Search ............. 350/333, 343, 334, 336, 350/339 R, 344; 340/719, 765, 784

[56] References Cited

U.S. PATENT DOCUMENTS

| 3,863,332 | 2/1975 | Leupp et al. ............. 350/344 |
| 4,256,382 | 3/1981 | Piliavin et al. ........... 350/344 |
| 4,264,149 | 4/1981 | De Zwart et al. ......... 350/336 |
| 4,568,149 | 2/1986 | Sugata et al. ............ 350/339 F |
| 4,653,864 | 3/1987 | Baron et al. ............. 350/344 |
| 4,663,494 | 5/1987 | Kishi et al. .............. 437/194 |
| 4,684,218 | 8/1987 | Aizawa et al. ............ 350/336 |
| 4,763,995 | 8/1988 | Katagiri et al. .......... 350/344 |
| 4,869,576 | 9/1989 | Aoki et al. .............. 350/336 |
| 4,948,708 | 8/1990 | Veevliet et al. .......... 350/344 |

FOREIGN PATENT DOCUMENTS

| 0258848 | 3/1988 | European Pat. Off. ...... 350/344 |
| 0028004 | 2/1980 | Japan ................... 350/344 |
| 0182414 | 9/1985 | Japan ................... 350/344 |

OTHER PUBLICATIONS

Addy et al.-"Spaced Liquid Crystal Display", p. 2128. IBM Technical Disclosure Bulletin-vol. 23-No. 5-Oct. 80, p. 2128.

Primary Examiner—Stanley D. Miller
Assistant Examiner—Tai V. Duong
Attorney, Agent, or Firm—John C. Fox

[57] ABSTRACT

Liquid crystal display devices having very small cell thicknesses are obtained by means of underetching techniques. Via etching holes (17, 29, 31) an auxiliary layer (27) between a supporting plate (2) and a cover plate (14) is removed. Dependent on the technique used spacers (18) are formed at the area of the etching holes or in between the etching holes. The device obtained has a uniform thickness over large surface areas.

20 Claims, 4 Drawing Sheets

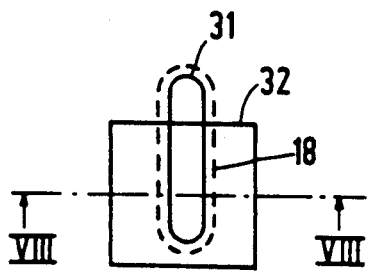
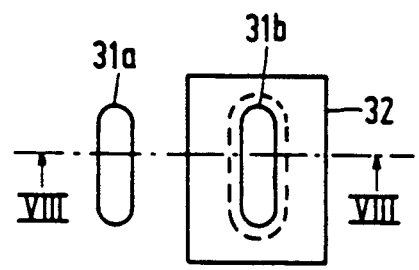
FIG.7a  FIG.7b
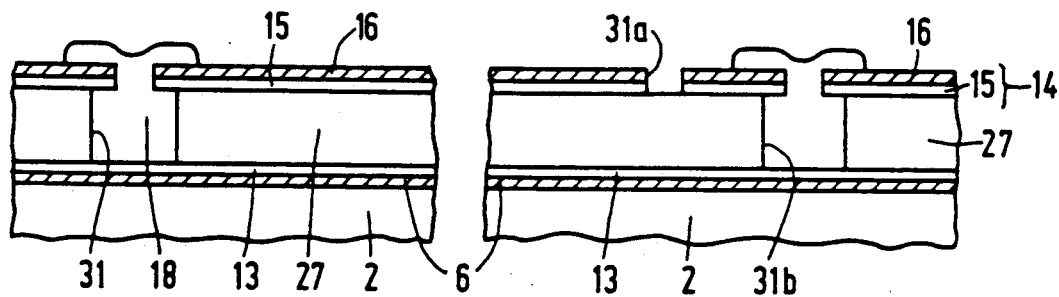
FIG.8a  FIG.8b

LIQUID CRYSTAL DISPLAY DEVICE

BACKGROUND OF THE INVENTION

The invention relates to a liquid crystal display device comprising a liquid crystalline medium between a supporting plate, and a cover plate at least one of which plates is transparent and each of which is at least provided with a layer comprising a conducting material and, if necessary, a layer of protective material on the side of the liquid crystalline medium.

The invention also relates to a method of manufacturing such a display device.

Such a display device is used, for example, in colour television or in (colour) monitors for data display and in automotive dashboards, etc., but they may also be used as light switches in optical equipment or other optical applications. In addition, such devices are increasingly being used in projection television.

The supporting plate and the cover plate are generally in the form of two glass substrates on which electrodes (metal patterns) are provided. These substrates have a given thickness to render them mechanically robust, which is necessary because during assembly spacers are provided between the plates and the plates are pressed against the spacers by applying sub-atmospheric pressure.

Usually fibres or spheres of the desired dimensions, which are deposited in advance on one of the plates, are chosen for the spacers. Since a certain spread occurs in the diameter of these fibres or spheres, there will be a local spread in the thickness of the liquid crystal layer. This spread is increased by unevennesses in the supporting plate and/or the cover plate owing to the presence of metal tracks and electronic switching elements such as diodes and transistors. A surface unevenness of the order of 0.5 $\mu$m is no exception. Especially at smaller cell thicknesses (2 to 3 $\mu$m) this variation will play a considerable role.

A partial solution to this problem is proposed in German Offenlegungsschrift No. 35,29,581. As described therein, after completion of the supporting plate, the spacers are defined by coating the plate with a uniform layer of, for example, a resin or photoresist and an insulating layer, whereafter the spacers are formed photolithographically from this double layer. A second supporting plate or cover plate is subsequently laid on the spacers while simultaneously maintaining a sub-atmospheric pressure in the space corresponding to the cell to be formed.

Various problems occur in such a manufacturing method. In the first place, the two supporting plates must be correctly positioned with respect to each other. Moreover, particularly for small cell thickness, it is difficult to fill the devices with liquid crystal material.

In the above method, it also appears that there is still a variation in the thickness of the liquid crystal layer which may be up to 10% or more of the total layer thickness. For a large part, these differences in thickness are caused by the fact that unevennesses in the one supporting plate are not compensated by off-setting variations in the other supporting plate.

OBJECTS AND SUMMARY OF THE INVENTION

It is an object of the invention to provide a liquid crystal display device in which these problems are largely solved and in which the variation in thickness is at most 4%, especially in thin liquid crystal layers.

In addition the invention has for its object to provide a plurality of methods of manufacturing such a device in a small number of process steps.

A display device according to the invention is characterized in that the layer of conducting material of the cover plate has at least one opening.

The spacers are now formed, for example, by the conducting material extending as far as the supporting plate or by insulating material such as, for example, cured photoresist provided at the area of the opening.

In a further embodiment these spacers are located at substantially equal distances from a plurality of openings.

The invention is based on the recognition that the cover plate and the supporting plate can be formed in such a manner that they constitute each other's replica, and that such structures can be realised in a technologically easy manner by underetching techniques in which the various openings are used as etching holes. In this respect it is to be noted that the use of underetching techniques for manufacturing display devices is known per se from German Offenlegungsschrift No. 26,41,283.

According to the invention, it is possible to manufacture devices with a very small layer thickness (0.1–3 $\mu$m) having thickness variations of less than 4%. Such a device is very suitable, for example, for display media whose operation is based on liquid crystal effects occurring at a small thickness such as, for example, zero-order birefringence (ECB effect; Electrically Controlled Birefringence) or for ferroelectric display media.

Due to the small thickness of the cell, the relaxation time will also be shorter when using other liquid crystalline materials (for example, twisted nematic) so that cells filled with such materials can be driven more rapidly.

An additional advantage is that the openings for underetching can also be used for filling the cells. The viscous resistance of the liquid crystals considerably increases with decreasing cell thickness when filling the cells from the side, which leads to unacceptably long filling times. Thus, in a preferred embodiment of the device according to the invention, a plurality of filling openings are provided in the cover plate so that filling is effected even more rapidly.

In another preferred embodiment, silicon is chosen as the material for the supporting plate, in which then the control electronics can be realised.

A first method of manufacturing a display device according to the invention is characterized in that the greater part of the intermediate layer is removed by underetching via openings in the cover plate, and in that the remaining parts of the intermediate layer are left as spacers.

In a further method, the intermediate layer is removed completely. Such a method is characterized in that depressions which are at least partly filled up with insulating material are provided in the intermediate layer.

BRIEF DESCRIPTION OF THE DRAWINGS

The invention will now be described in greater detail by way of example with reference to the accompanying drawings in which

FIGS. 7a and 7b show diagrammatically a further embodiment of a display device according to the invention; and FIGS. 8a and 8b are diagrammatic cross-sections taken on the line VIII—VIII in FIG. 7.

The Figures are diagrammatic and not to scale, and corresponding elements usually have the same reference numerals.

DESCRIPTION OF THE PREFERRED EMBODIMENTS

Figure 1:
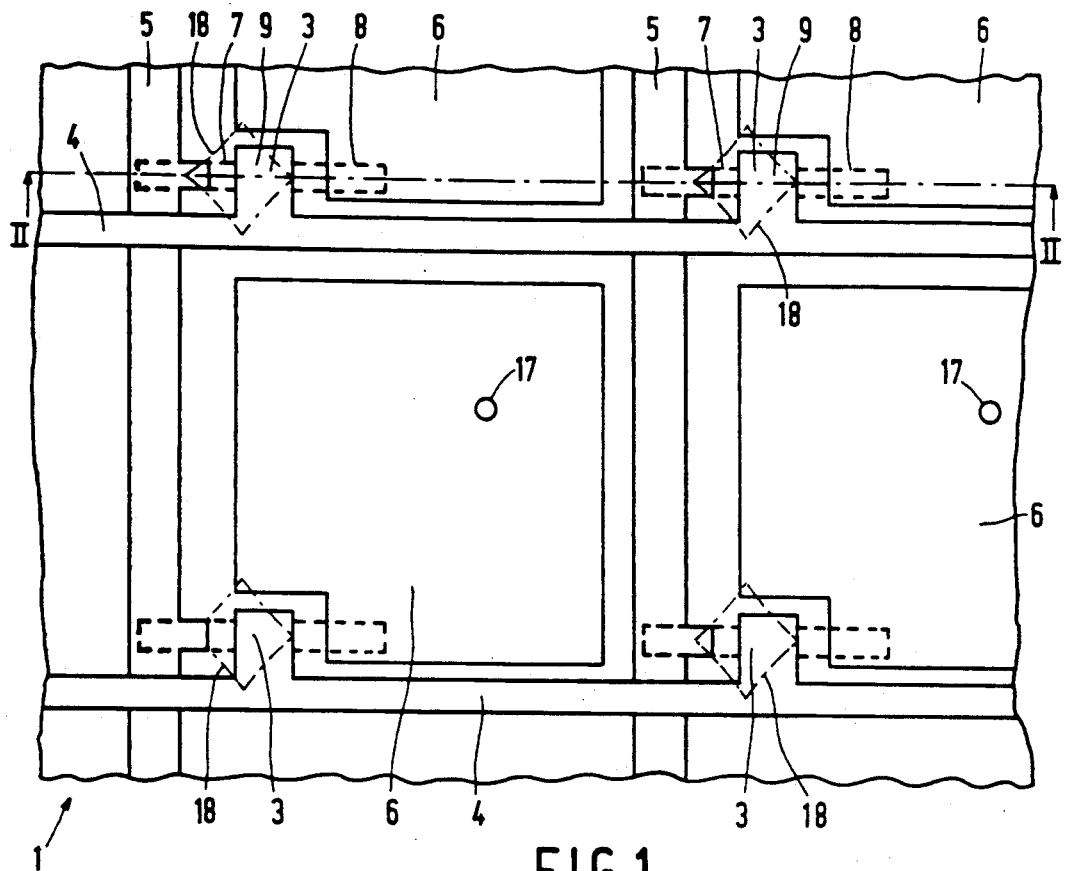
FIG. 1 is a diagrammatic plan view of a portion of a display device according to the invention.
Figure 2:
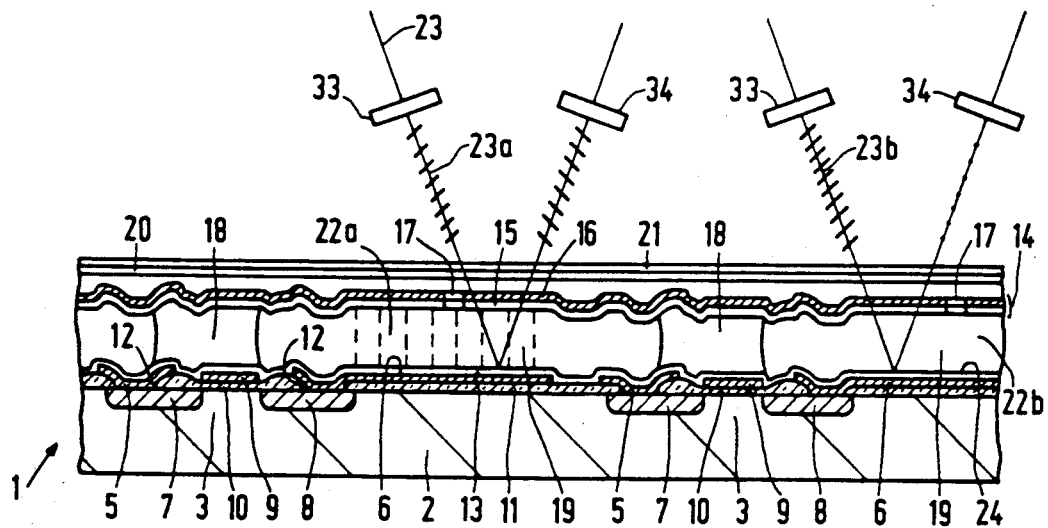
FIG. 2 is a diagrammatic cross-section taken on the line II—II in FIG. 1.

FIG. 1 is a plan view and FIG. 2 is a cross-section taken on the line II—II in FIG. 1 of a liquid crystal display device 1 according to the invention. This embodiment comprises a silicon supporting plate 2 in which semiconductor circuits are located including MOS transistors 3.

The MOS transistors 3, which operate as switches, are located at the area of crossings of line electrodes 4 and column electrodes 5. In the switched-on state they connect the column electrodes 5 to picture electrodes 6 via source and drain zones 7, 8. The line electrodes 4 control the switch-on and switch-off states of the transistors 3 via gate electrodes 9, which are separated by a thin gate oxide 10 from the channel region between the source and drain zones 7, 8. Outside the channel region, the semiconductor body constituting the supporting plate 2 is coated with an insulating layer 11 of, for example, silicon oxide, and is provided with contact holes 12 for contacting the source and drain zones 7, 8.

The assembly of transistors and electrodes is coated with a protective layer 13 which, if necessary, may also serve as an orientation layer for a liquid crystal to be used.

The device also comprises a cover plate 14 composed of a protective layer 15 of aluminium oxide and a layer 16 of transparent conducting material, for example, indium tin oxide.

According to the invention the cover plate 14 has at least one opening 17. In this embodiment the cover plate 14 has a plurality of openings 17 which are provided in the double layer 15, 16, while the device is also provided with spacers 18, in this embodiment of magnesium oxide.

Furthermore the space between the supporting plate 2 and the cover plate 14 is filled with liquid crystal material, in this embodiment a homeotropic liquid having a negative dielectric anisotropy, for example, ZLI 3160 of the firm of Merck, but other materials are alternatively possible.

Finally the device is provided with a second cover plate 20, but this is not strictly necessary to keep the liquid crystalline material in the cell. In fact it has been found that the cell thus formed is rapidly filled with the liquid crystal material via the openings 17 and remains full due to a strong capillary action. The second cover plate 20, which may rest on cover plate 14 directly or via supporting members, creating an airgap, is therefore only used to protect the device from dirt rather than to keep the liquid within the cell, and it may also serve as a support for a colour filter 21. The cover plate 20 may itself form a colour filter which can be provided at approximately 10 $\mu$m from the cell so that there is substantially no parallax.

The distance between the supporting plate 2 and the cover plate 14 is approximately 1 $\mu$m in this embodiment, with a tolerance of less than 2%. An advantage of such a small thickness is the shorter relaxation time of a plurality of liquid crystal effects, which are inversely proportional to the square value of the thickness. Consequently fast switch-off times are possible.

The device shown is used in the reflection mode. For incident radiation 23 with a wavelength $\lambda_o$ the polariser 33 has a direction of polarisation which extends at an angle of 45° to the direction of orientation which is introduced, for example, via the (protective) orientation layer 13 into the liquid crystal when the cell receives a given voltage V directing the molecules parallel to the wall of the cell (region 22a). With the chosen dimension and liquid this region then functions as a 0.5 $\lambda$ plate for radiation 23a at a wavelength of $\lambda_o$ so that the direction of polarisation is rotated through 90° and the radiation 23a is passed on by an analyser 34 whose direction of polarisation is rotated through 90° with respect to that of the polariser 33.

At voltage 0 (region 22b) the beam 23b is extinguished by the homeotropic liquid after it has been polarised. If desired, grey tints can be realised by applying intermediate voltages.

The device of FIGS. 1, 2 may be manufactured as follows. The starting material is a supporting plate 2, in this embodiment a silicon substrate in which MOS transistors 3 for drive purposes and further peripheral electronics are integrated. The picture electrodes 6 have a dimension of, for example, 50×50 ($\mu$m)$^2$ so that the total dimension (including peripheral electronics) is approximately 6×6 cm$^2$ in a display device with 1000×1000 elements. Since in this example a device operating in the reflection mode is concerned, the picture electrodes 6 are formed with reflective material (for example aluminium). If desired, the line and column electrodes 4, 5 may be made of polycrystalline silicon.

The substrate including electronics and electrodes is subsequently coated with a protective layer 13 by means of a homogeneous deposition technique. This protective layer 13 is a dielectric such as SiO$_2$ and has a thickness of approximately 0.1 $\mu$m.

If necessary, the free surface 24 of the layer 13 is treated (for example, by rubbing with velvet) in order to give the adjacent liquid crystal molecules a preferred direction.

A layer of magnesium oxide (MgO) is then vapour-deposited at approximately 250° C. by means of homogeneous deposition techniques. The layer has a thickness of approximately 1.1 $\mu$m and its surface microscopically follows the surface of the supporting plate 1 including transistors, electrodes and protective layer 13. It appears that also for very large surfaces such a layer can be provided in thicknesses of 0.1 $\mu$m with an accuracy of 4%. The thickness d of 1.1 $\mu$m is determined by the wavelength used and the liquid crystal material via the formula $$d = \frac{\frac{1}{4}\lambda 0}{\Delta n},$$

in which Δn is the birefringence of the liquid crystal material, and λ₀ is the wavelength of the incident radiation d is chosen to be slightly larger in practice. In the present example ZLI 3160 (Merck) is chosen as a liquid crystal material. In this case it holds that Δn is 0.13, while λ₀ is chosen to be 550 nm.

The following layers are successively vapour-deposited on the layer of magnesium oxide at approximately 300° C.:

an approximately 0.2 μm thick layer 15 of aluminium oxide (Al₂O₃) which functions as a dielectric in the ultimate device and in addition provides extra mechanical strength;

an approximately 0.15 μm thick layer of indium tin oxide for the conducting layer 16.

If desired, the free surface of the layer of magnesium oxide may be subjected to an orienting surface treatment before providing the layers 15, 16. In fact, it has been found that the preferred direction obtained by rubbing or another method is taken over by the material 15 which is deposited on this surface. In this case the previous direction of orientation can be followed in order to reinforce the preferred adjustment through the entire liquid crystal layer; alternatively a different direction of orientation can be chosen in order to given the liquid crystal molecules a desired twist. In the case of a single preferred direction it appears that one surface treatment is sufficient for thin layers of liquid crystal material.

Subsequently the locations of the circular openings 17 with a diameter of 2 μm are defined by means of photolithographic techniques. The openings 17 in the layers 15, 16 are obtained by first etching the indium tin oxide of the layer 16 at the location of openings in the photoresist for 90 seconds at 45° C. in a bath containing 250 ml of HCL (36%), 30 g of FeCl₃, 25 ml of HNO₃ (65%), 250 ml of H₂O, and by subsequently etching the exposed aluminium oxide 15 in a 5% HF solution for 45 seconds at room temperature.

The greater part of the magnesium oxide intermediate layer is removed by underetching via the openings 17 which are now provided in the layers 15, 16. This is effected, for example, using a 5% H₂SO₄ solution at 35° C. in approximately 75 seconds. As a result of the underetching treatment only the spacers 18 are left at regular distances from one another.

Since the intermediate layer can be provided very accurately in a given thickness, the distance between substrate 1 and cover plate 15, 16 is substantially constant. The elements 18 are at a mutual distance of approximately 50 μm from one another so that the layer can be considered to be substantially rigid.

After rinsing in distilled water, acetone (for removing the photoresist) and, for example, hexane, the cell is filled with liquid crystal material 19. This is done, for example, by providing a thin layer of the liquid crystal material on the cover plate and due to the relatively large capillary forces the cells will be filled rapidly. The superfluous liquid crystal material is removed and the device is provided with a second cover plate 20 of glass or synthetic material foil. This plate only serves as a protection against external influences. The openings 17 need not be closed since it has been found that the capillary forces are sufficient to prevent the liquid crystal material from flowing back.

After the colour filter 21 is provided by means of conventional techniques, the device of FIG. 1, 2 is completed.

An advantage of the method described is that only one alignment step is required, namely for defining the openings 17 (via the photoresist).

In addition very thin cell thicknesses are possible (from 0.1 μm) with a great homogeneity over large surfaces. The thin cell thicknesses notably provide attractive use of effects based on zero-order birefringence (ECB) and ferroelectric liquid crystals.

In the embodiment shown, use in the reflection mode enables the use of a silicon substrate as a supporting plate providing the possibility of using the various advantages of silicon IC techniques such as "redundancy" and high device yields.

Figure 3:
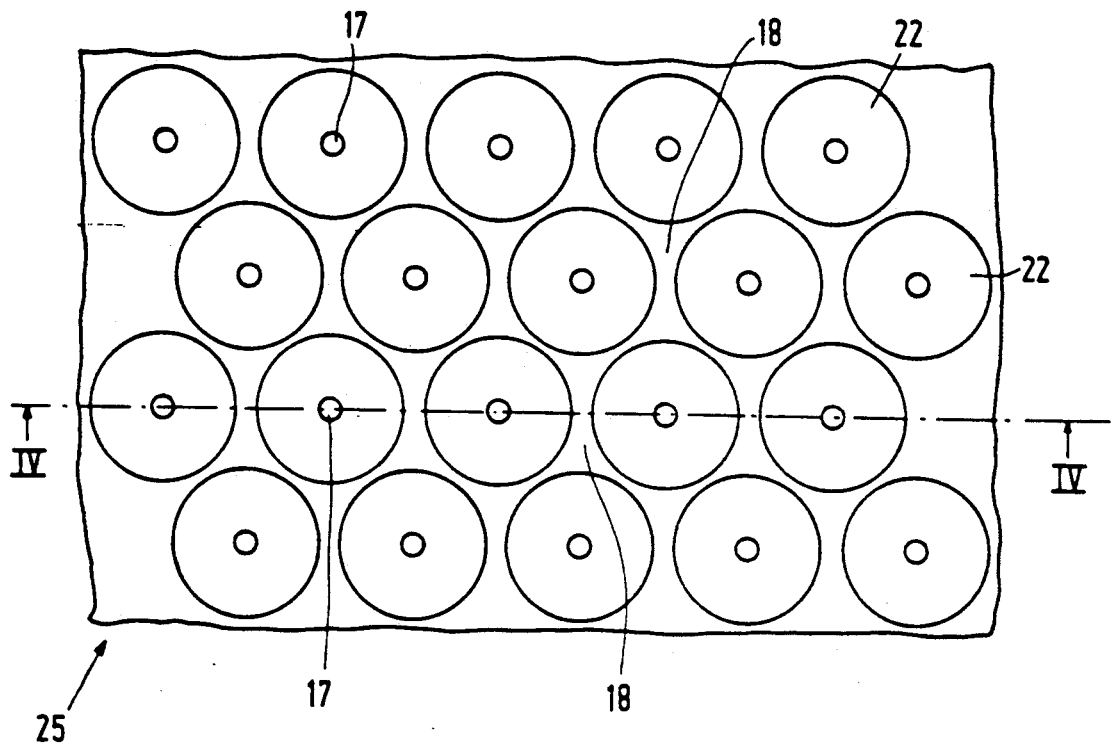
FIG. 3 is a diagrammatic plan view of a portion of another display device according to the invention.
Figure 4:
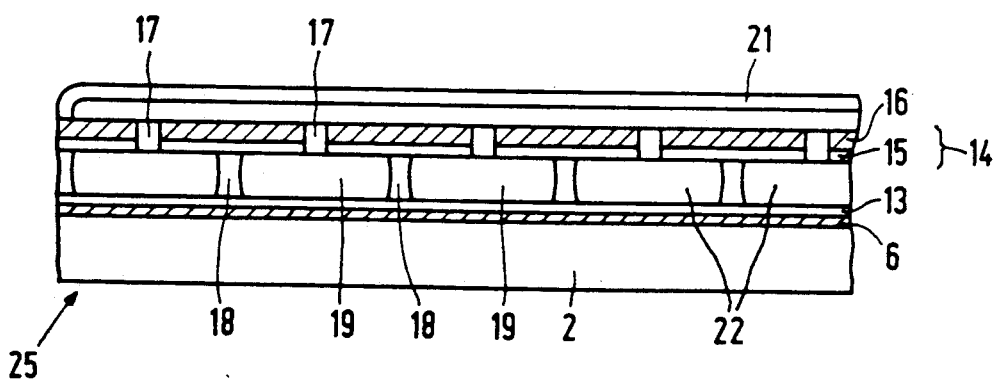
FIG. 4 is a diagrammatic cross-section taken on the line IV—IV in FIG. 3.

FIG. 3 is a plan view and FIG. 4 is a cross-section taken on the line IV—IV in FIG. 3 of an optical switch 25 whose structure is substantially identical to the device of FIGS. 1, 2, except that the supporting plate 2 is now made of glass to enable operation in the transmission mode, and one continuous electrode 6 of indium tin oxide is provided on this plate. In this embodiment, underetching is continued until a separate cell 22 which is separated from the other cells 22 is associated with each opening 17. Due to the position of the openings 17 (to be compared with a close packed layer), the surfaces of the cells 22 fill substantially the entire surface area of the device (approximately 90%). The device can be made transparent or non-transparent via voltages at the electrodes 6, 16. Otherwise the reference numerals have the same significance as those in FIGS. 1, 2. If necessary, the device may be provided with one or more polarisers. In this case (transparent cell) the cover plate 21 may also function as a polariser.

The metallisation layers 6, 16 may also be in the form of columns and rows by dividing the indium tin oxide electrodes into a crossbar system with pixels at the area of the crossings. The layer 15 of Al₂O₃ then provides additional robustness. Such a device is very suitable for multiplex devices.

Figure 5:
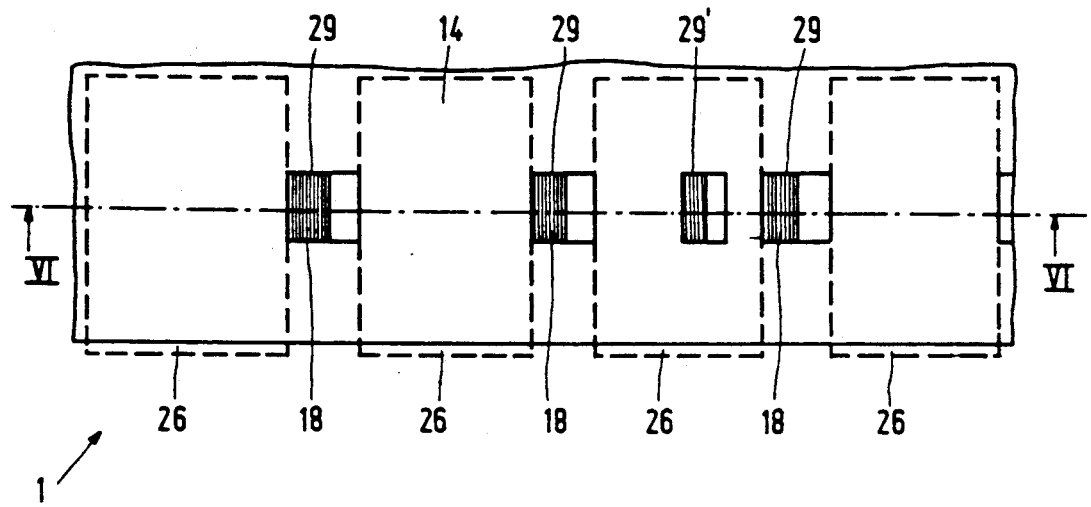
FIG. 5 is a diagrammatic plan view of a portion of yet another display device according to the invention.
Figure 6A:
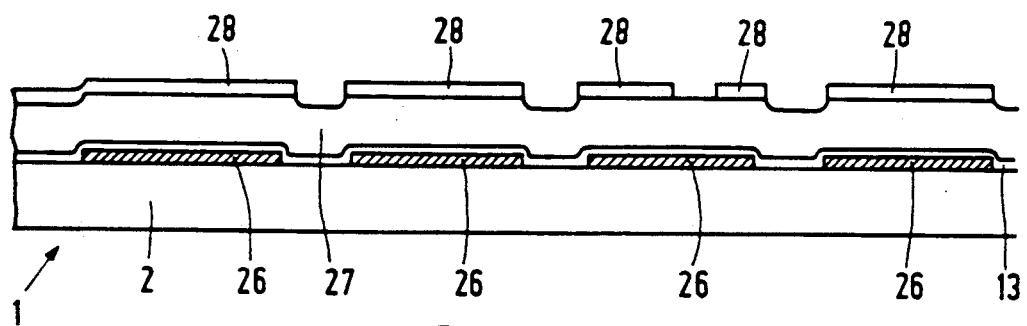
FIGS. 6a and 6b are a diagrammatic cross-sections taken on the line VI—VI in FIG. 5 at different manufacturing stages.
Figure 6B:
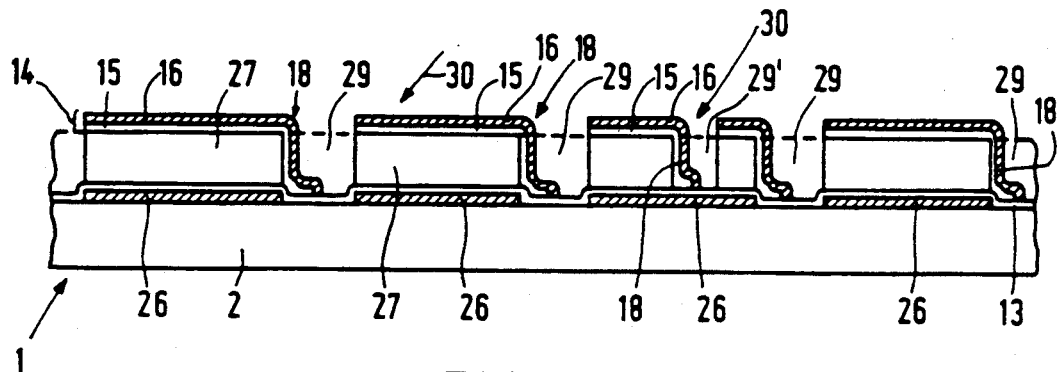

FIG. 5 is a plan view of a part of a slightly different display device according to the invention, while FIGS. 6a and 6b show the device during different stages of manufacture, taken on the line VI—VI in FIG. 5.

In this case a display device 1 is shown which is operated in the transmission mode. Lower electrodes 26 and drive elements not shown, for example, transistors realised in amorphous or polycrystalline silicon, are provided on a transparent supporting plate 2, whereafter the assembly is coated with a protective layer 13 in which, if necessary, a preferred direction or orientation for the liquid crystal is provided.

Subsequently a layer 27 of magnesium oxide with an accurately defined thickness and following the topology of the subjacent plate on a microscopic scale is provided on this assembly. A photoresist layer 28 is provided and patterned thereon by means of photolithographic techniques. With this pattern as a mask openings 29 having dimensions of for example 2×2 μm² are etched in the subjacent layer 27. Subsequently the protective layer 15 and the layer of conducting material 16 are provided by means of oblique vapour deposition, indicated by arrows 30 in FIG. 6b, in these openings and on the remaining parts of the layer 27. With a suitably chosen vapour deposition angle (approximately 45° )

and dimensions of the openings 29, the double layer 14 extends in the openings 29 as far as the coating 13 of the lower supporting plate and constitutes spacers 18 in situ. This may be effected at the area above a lower electrode 26 (opening 29') but alternatively between the lower electrodes. In the first-mentioned case the protective layer 13 may, if necessary, be removed locally in advance in order to obtain through-connections between lower electrodes 26 and upper electrodes 16.

The layer 27 can now be removed again via the openings 29, 29'. This etching step is no longer critical as in the previous embodiments, because the spacers 18 are resistant to the etchant. The openings 29 have otherwise the same functions as the openings 17 in FIGS. 1, 2. After a cleaning step, the cell can be filled with liquid crystal material, whereafter a second cover plate and one or more polarisers are provided.

In yet another method of manufacturing a device according to the invention and as shown in FIGS. 7a, 7b, 8a and 8b the supporting plate 2 is successively provided with electrodes 6, a protective layer 13 and a layer 27 of MgO which in its turn is coated with a protective layer 15 and a layer 16 of indium tin oxide. Openings or slots 31 with dimensions of, for example, $2 \times 6$ μm are provided in the layers 15, 16 and subsequently in the layer 27 by means of photolithographic techniques; the MgO of the layer 27 may be slightly underetched in this case. Subsequently the photoresist layer is removed and photoresist is provided again which also fills the slots 31.

This photoresist is exposed with a mask 32 so that after development the spacers 18 consisting of cured photoresist (at 200° C.) are left. These partly fill the openings 31 so that accesses for the etchant (and at a later stage the liquid crystal material) are formed again.

The invention is of course not limited to the embodiments shown but several variations are possible within the scope of the invention.

For example, in the embodiment of FIGS. 7a, 7b, 8a and 8b, formed in such a manner that the opening 31b is entirely filled with photoresist and hence with a spacer 18. In this case the layer 28 can be removed via a second opening 31a, which opening is temporarily coated with an auxiliary mask during underetching of the layer 27 so that the opening 31a is not transferred in the layer 27. In the latter example an inorganic material can be used instead of photoresist for forming the elements 18 therefrom.

In addition the spacers 18, notably in the devices of FIGS. 5, 6a and 6b, 7a and 7b, 8a and 8b may extend along the edge of an upper electrode.

In a device which is operated in the reflection mode, the cover plate may be made opaque and the supporting plate may be made transparent.

What is claimed is:

1. A liquid crystal display device comprising a liquid crystalline medium between a supporting plate and a cover plate, at least one of which plates is transparent and each of which is at least provided with a layer comprising a conducting material, characterized in that the layer of conducting material of the cover plate has a two-dimensional array of openings and in that spacing material is present between the plates at substantially equal distances from the openings.

2. A liquid crystal display device as claimed in claim 1, characterized in that the spacing material encloses substantially circular spaces for the liquid crystalline medium around the openings.

3. A liquid crystal display device as claimed in claim 1, characterized in that the layer of conducting material of the cover plate substantially extends toward the supporting plate into the opening in the conducting material.

4. A liquid crystal display device as claimed in claim 1, characterized in that a spacer is present at the area of the opening in the conducting material of the cover plate.

5. A liquid crystal display device as claimed in claim 4, characterized in that the spacer comprises cured photoresist.

6. A liquid crystal display device as claimed in claim 3, characterized in that the opening is present along at least a part of the edge of an electrode formed from the conducting material.

7. A liquid crystal display device as claimed in claim 1, characterized in that the conducting material of the supporting plate and cover plate are strip-shaped rows and columns defining pixels at the area of the crossings of the rows and columns.

8. A liquid crystal display device as claimed in claim 1, characterized in that the device comprises at least one electrically conducting through-connection between the conducting material of the supporting plate and that of the cover plate.

9. A liquid crystal display device as claimed in claim 1, characterized in that the distance between the plates is at most 3 μm.

10. A liquid crystal display device as claimed in claim 1, characterized in that the supporting plate comprises silicon.

11. A liquid crystal display device as claimed in claim 10, characterized in that the silicon plate comprises control electronics.

12. A liquid crystal display device as claimed in claim 1, in which a layer of protective material is provided on at least one of the layers of conductive material on the side of the liquid crystalline medium.

13. A liquid crystal display device as claimed in claim 4, characterized in that the opening is present along at least a part of the edge of an electrode formed from the conducting material.

14. A liquid crystal display device as claimed in claim 5, characterized in that the opening is present along at least a part of the edge of an electrode formed from the conducting material.

15. A liquid crystal display device as claimed in claim 2, characterized in that the conducting material of the supporting plate and cover plate are strip-shaped rows and columns defining pixels at the area of the crossings of the rows and columns.

16. A liquid crystal display device as claimed in claim 2, characterized in that the conducting material of the supporting plate and cover plate are strip-shaped rows and columns defining pixels at the area of the crossings of the rows and columns.

17. A liquid crystal display device as claimed in claim 3, characterized in that the conducting material of the supporting plate and cover plate are strip-shaped rows and columns defining pixels at the area of the crossings of the rows and columns.

18. A liquid crystal display device as claimed in claim 4, characterized in that the conducting material of the supporting plate and cover plate are strip-shaped rows and columns defining pixels at the area of the crossings of the rows and columns.

19. A liquid crystal display device as claimed in claim 5, characterized in that the conducting material of the supporting plate and cover plate are strip-shaped rows and columns defining pixels at the area of the crossings of the rows and columns.

20. A liquid crystal display device as claimed in claim 6, characterized in that the conducting material of the supporting plate and cover plate are strip-shaped rows and columns defining pixels at the area of the crossings of the rows and columns.

* * * * *